Figure 1:
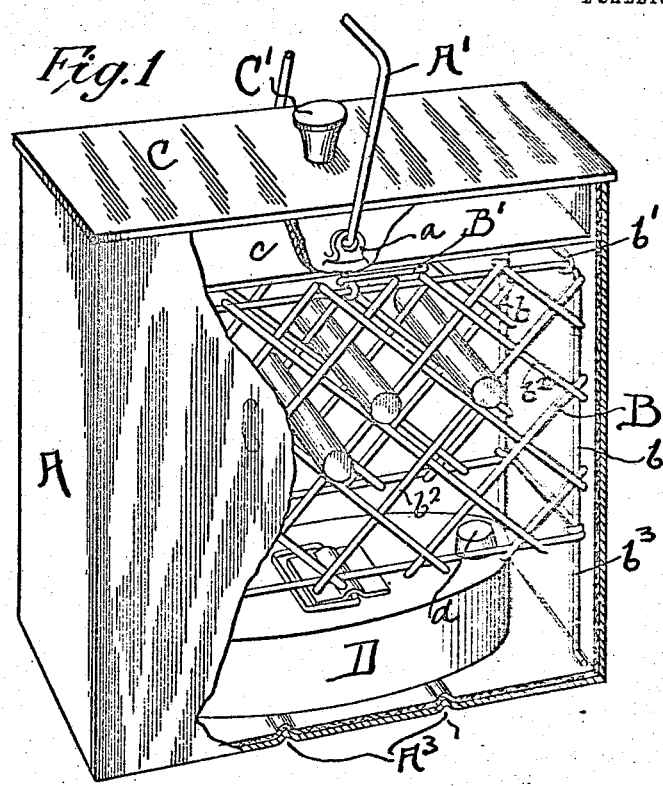

No. 895,028. PATENTED AUG. 4, 1908.
B. F. KELLY.
HEATER FOR DYNAMITE OR OTHER EXPLOSIVES.
APPLICATION FILED SEPT. 6, 1907.

2 SHEETS—SHEET 1.

Attest,
F. E. Alexander
Jas. F. Nagle

Benjamin F. Kelly, Inventor:
by his Att'y's;

No. 895,028. PATENTED AUG. 4, 1908.
B. F. KELLY.
HEATER FOR DYNAMITE OR OTHER EXPLOSIVES.
APPLICATION FILED SEPT. 5, 1907.

2 SHEETS—SHEET 2.

Attest:
F. F. Alexander
Jas. F. Nagle.

Benjamin F Kelly Inventor,
By his Att'ys,
Henry Tough

UNITED STATES PATENT OFFICE.

BENJAMIN F. KELLY, OF SALT LAKE CITY, UTAH.

HEATER FOR DYNAMITE OR OTHER EXPLOSIVES.

No. 895,028.          Specification of Letters Patent.          Patented Aug. 4, 1908.

Application filed September 6, 1907. Serial No. 391,557.

*To all whom it may concern:*

Be it known that I, BENJAMIN F. KELLY, a citizen of the United States, residing at Salt Lake City, county of Salt Lake, and State of Utah, have invented certain new and useful Improvements in Heaters for Dynamite or other Explosives, of which the following is a specification.

My invention relates to means for heating sticks of dynamite, nitro-glycerin and other high explosives, and it consists essentially in a casing having therein a removable hot water container entirely closed from communication with the interior of the casing and a rack within the container so arranged in compartments as to hold sticks of explosive, but permitting a circulation of warm air in contact with the sticks and entirely around the same, preventing, however, the sticks being so arranged as to block the passage of the warm air upward through all parts of the casing.

It is well known that the necessity of heating dynamite for blasting purposes is the cause of great loss of life. Inasmuch as dynamite is very largely used in situations where it is impossible to provide other than the simplest appliances, it is usually heated by being placed in the oven of an ordinary stove or before an open fire. These methods are accompanied with great danger that the dynamite will become overheated and will explode. Another method of heating used in situations where proper appliances can be had consists in heating by means of a steam coil. Here not only is the heat liable to become excessive but the contrivances demand an amount of apparatus not consistent with the rude conditions under which these explosives are ordinarily used.

My invention has for its object the heating of dynamite in an extremely simple manner and by means of a heater which while thoroughly effective cannot possibly act to overheat the dynamite but in which the heat while primarily ample for the purpose and continued for as long a period as desired, gradually decreases and cannot by any possibility rise above the danger point; an apparatus so arranged that the heat will come in direct contact with the sticks and yet so arranged as to hold each stick separate from the others and absolutely preventing the massing of the sticks together and hence the unequal distribution of heat; thus making an apparatus which is absolutely harmless even in the hands of the most ignorant.

In addition to these minor objects of my invention, it consists in making a heater and container for dynamite sticks which may be very easily handled, can be carried from place to place and which will also provide a means for holding fuses, caps and other appurtenances.

Figure 2:
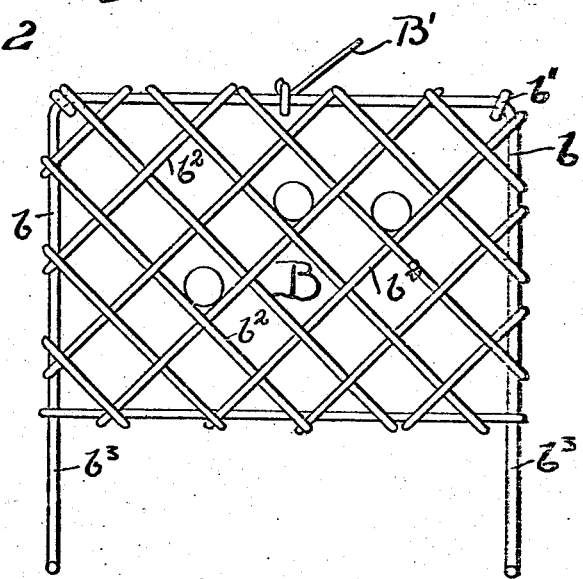
Figure 3:
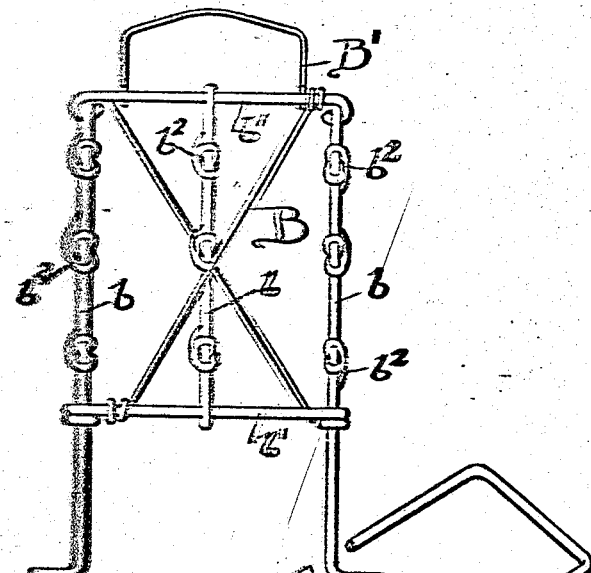
Figure 4:
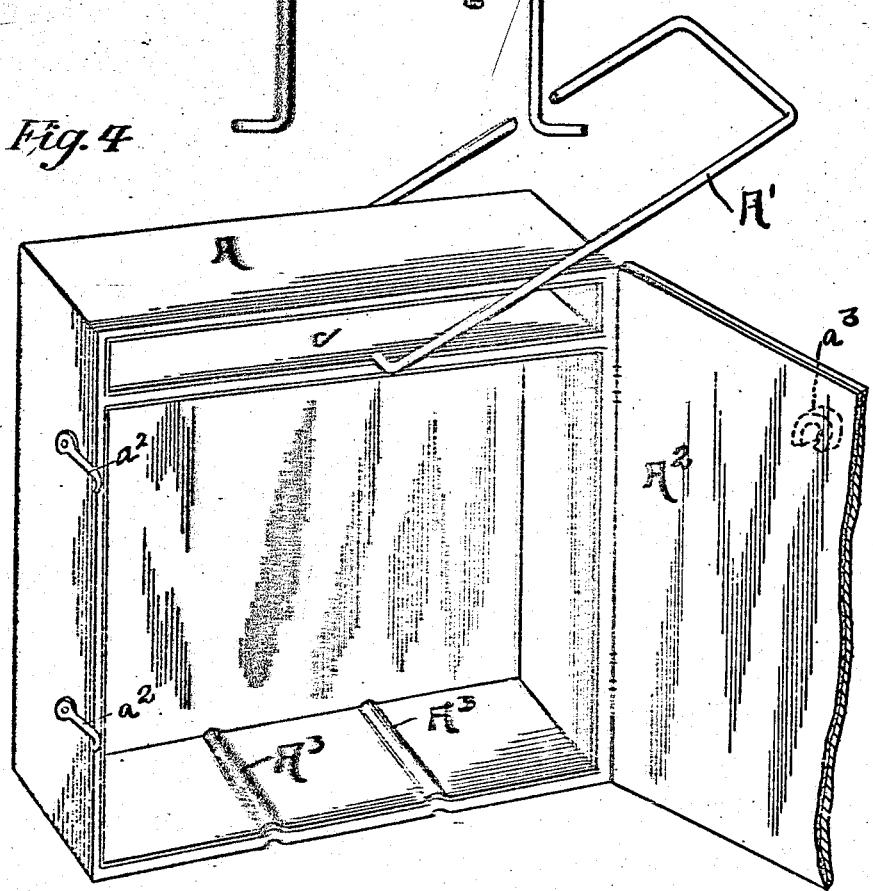

In the drawings, wherein I have shown an embodiment of my invention, Figure 1 is a perspective view of the heating casing, the front of said casing being broken away to show the heater, rack and cover. Fig. 2 is a front elevation of the rack. Fig. 3 is an end elevation of a rack. Fig. 4 is a front elevation of a modified form of casing.

Throughout the figures like reference characters designate like parts.

A designates a casing of wood, metal or composition, preferably rectangular in shape with one side open or adapted to be opened for the insertion of a rack B. In Fig. 1 I have shown the casing A as open at the top and as formed of a single thickness of metal lined with non-conducting material. It will be understood, however, that I may form the casing in any desired manner if I so desire without departing from the spirit of my invention.

Closing the open end of the casing A is the cover C, said cover as shown in Fig. 1 being formed with a chamber $c$ below it for the holding of fuses and other devices to be used in the operation of blasting. The cover is provided with a handle C' and its edge, when the cover is in place, projects over the upper edge of the casing A.

A' designates a pivoted bail or handle whereby the casing may be carried, the bail engaging at its lower end in ears $a$.

In Fig. 4 I have shown a modification of the casing, in which the casing is provided with a door $A^2$ in place of the cover C, this door being hinged to one side of the casing A. The door is provided with latches $a^2$ whereby it may be closed and has also an ear $a^3$ which may be engaged by the bail A'. In this construction it will be seen that the bail cannot be applied until the door is closed, thus preventing any possibility of the door being left open and thus allowing the falling out of the cartridges.

B designates the dynamite rack. As I have shown it, it consists of a wire or metal frame preferably of metal rods and heavy wire, the frame consisting of the U-shaped end rods $b$ connected at suitable distances by cross rods $b'$ and the cross diagonal rods or wires $b^2$. The spaces between each two of the crossed wires form openings and upports into which the cartridge may be inserted and by which it is supported. I may use any number of main frames with crossed wires but I have shown two, as I believe these to be amply sufficient. A third frame, however, located between the outer frames would serve to support the center of the cartridge. I have shown such a third frame in the end view Fig. 3. The top of the rack is provided with a bail or handle $B'$ whereby the rack can be conveniently carried. The lower portion of the rods $b$ extends downward to form the legs $b^3$ supporting the main portion of the rack some distance above the bottom of the casing.

Adapted to rest upon the floor of the casing is the hot water container or heater D of any suitable desired form. I have shown it as a metallic vessel slightly smaller than the interior of the casing A and supported above the main floor of the casing by transverse corrugations $A^3$ on the bottom of the casing. The container is provided with a filling opening $d$ covered by a cap. The heater D being supported upon the corrugations $A^3$ and being narrower than the width of the casing A, the heat from all sides of it will pass upward into the upper portion of the casing. It will be understood, however, that I do not wish to be limited to this form of heater as the same may be of any desired shape and made of any material consistent with its containing hot water.

In the construction shown in Fig. 4, the top C of the casing is not removable as it is in Fig. 1, but the top and the chamber $c$ are permanently supported in place above the rack. The door $A^2$ securely closes the side opening of this compartment.

In operation the heater D is filled with boiling water. The dynamite sticks are placed one in each of the spaces formed by the crossed wires and the rack placed within the casing. The casing is then closed and left until it is desired to use the dynamite. It may be easily transported by the miner from place to place, the dynamite keeping at the proper heat as the radiation from the hot water container is comparatively slight. A heater of the capacity of one gallon will heat about 50 sticks of dynamite or giant powder in about two hours. There is no danger in this operation for the reason that the heat is very gradual and slow and can never rise above a certain limit; that is, above the temperature of boiling water or any lower temperature than that at which the water is placed in the container. The heater must be heated away from the casing and then inserted. This is a very important point as it prevents any contact of fire or extraneous heat with the contents of the casing. As the container is not connected with any source of hot water supply or with any source of steam supply, the heat cannot increase within the casing. The heat simply continues over a considerable period and gets gradually less. Thus there is no danger of raising the temperature beyond a proper degree.

I have found by experience that the matter to be guarded against is the tendency of ignorant workmen to lay dynamite sticks in a heap or to place them in contact with each other in such manner as to prevent the heat coming in contact with the entire surface of the dynamite. If the cartridges are so placed as to come in contact with each other, they not only prevent the heat rising and being equally distributed throughout the casing, but adjacent cartridges are liable to stick to each other. This is a frequent cause of accidents.

By reason of the peculiar construction of my rack, it is impossible to place two sticks of powder in contact with each other. They are bound to be separated and a space left around each stick for the upward passage of the heat. In addition to this the rack may be easily cleaned to prevent any accretion of glycerin upon it. This ability to thoroughly cleanse the supports for the dynamite sticks is of considerable importance in the practical operation of the apparatus. The dynamite should come in contact with only the minimum amount of surface necessary to support it and that surface should be entirely open to observation and to cleansing.

It will be obvious that my rack may be very easily washed, dipped into hot water and otherwise cleaned. The compartment at the top of the casing is of considerable value as a means of keeping and holding the necessary fuses and keeping them in condition for reliable operation at all times.

Having described my invention what I claim is:

1. A heater for explosives comprising a casing, having an opening on one side, a cover for said opening, a bail on said casing for lifting the same, a closed hot water container removable from the casing but independent of the same adapted to be located in the bottom thereof, and a rack for supporting the explosive independent of the casing or heater but removable from said casing, said rack consisting of vertical frames provided with diagonally crossed bars between which the sticks of explosive are adapted to be supported.

2. A heater for dynamite comprising a casing having an opening on the upper side, a cover fitting into said opening, said cover being provided with a chamber on its under side adapted to contain material to be heated, the walls of said chamber extending downward and fitting against the walls of the casing, a bail on said casing for lifting the same, a rack for supporting the explosives, said rack consisting of vertical frames provided with diagonally-crossed bars between which the sticks of explosive are adapted to be supported, the rack being provided at its upper end with a bail whereby it may be lifted, and on its under side with legs adapted to rest upon the bottom of the casing when the rack is in place, and a closed hot water container removable from the casing but adapted to be located in the bottom thereof between the legs of said rack and beneath the dynamite supporting portion thereof.

3. A heater for dynamite comprising a casing having an opening on the upper side; a cover fitting into said opening, said cover being provided with a chamber on its under side adapted to contain material to be heated; a handle on said casing for lifting the same; a rack for supporting explosives, said rack consisting of U-shaped vertical side pieces suitably spaced from each other, each side piece being provided with diagonally crossed bars upon which the sticks of explosive are adapted to be supported out of contact with each other, said rack being provided at its upper end with a bail whereby it may be lifted and at its under side with legs adapted to rest upon the bottom of the casing when the rack is in place; and a closed hot water container removable from the casing but adapted to be located in the bottom thereof beneath the dynamite supporting portion of the rack.

In testimony whereof, I have signed my name to this specification in the presence of two subscribing witnesses.

BENJAMIN F. KELLY.

Witnesses:
RICHARD HARTLEY,
E. NEWTON.